United States Patent
Tatsumoto et al.

(10) Patent No.: US 11,577,738 B2
(45) Date of Patent: Feb. 14, 2023

(54) VEHICLE, VEHICLE CONTROL METHOD AND OPERATION MANAGEMENT SYSTEM

(71) Applicant: TOYOTA JIDOSHA KABUSHIKI KAISHA, Toyota (JP)

(72) Inventors: Yuki Tatsumoto, Nagoya (JP); Saori Matsumoto, Chofu (JP); Keigo Yamada, Toyota (JP); Akira Sasaki, Miyoshi (JP); Mitsuhiro Miura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 359 days.

(21) Appl. No.: 16/941,097

(22) Filed: Jul. 28, 2020

(65) Prior Publication Data
US 2021/0031788 A1 Feb. 4, 2021

(30) Foreign Application Priority Data
Jul. 31, 2019 (JP) .............................. JP2019-141646

(51) Int. Cl.
| | |
|---|---|
| G06V 40/10 | (2022.01) |
| B60W 50/00 | (2006.01) |
| B60W 60/00 | (2020.01) |
| G06Q 10/02 | (2012.01) |
| B60R 1/00 | (2022.01) |
| G06V 20/56 | (2022.01) |

(52) U.S. Cl.
CPC ........... *B60W 50/0098* (2013.01); *B60R 1/00* (2013.01); *B60W 60/0016* (2020.02); *B60W 60/00253* (2020.02); *G06Q 10/02* (2013.01); *G06V 20/56* (2022.01); *G06V 40/10* (2022.01); *B60R 2300/103* (2013.01)

(58) Field of Classification Search
CPC combination set(s) only.
See application file for complete search history.

(56) References Cited

U.S. PATENT DOCUMENTS

| | | | |
|---|---|---|---|
| 2015/0199619 A1 | 7/2015 | Ichinose et al. | |
| 2017/0330044 A1* | 11/2017 | Telpaz | ................ G05D 1/0088 |
| 2019/0012613 A1 | 1/2019 | Ikeda et al. | |
| 2020/0159251 A1* | 5/2020 | Iwasaki | ............ G08G 1/096805 |

FOREIGN PATENT DOCUMENTS

| | | |
|---|---|---|
| JP | 3175966 U | 6/2012 |
| JP | 2019-016290 A | 1/2019 |
| WO | 2014024254 A1 | 2/2014 |

\* cited by examiner

*Primary Examiner* — Vivek D Koppikar
*Assistant Examiner* — Jeffrey R Chalhoub
(74) *Attorney, Agent, or Firm* — Oliff PLC

(57) ABSTRACT

A vehicle includes a cabin having a first room and a second room that are capable of accommodating at least one passenger, and configured to isolate one or more passengers accommodated in the first room from one or more passengers accommodated in the second room, a guidance apparatus configured to guide the at least one passenger to be accommodated in either the first room or the second room, and a control apparatus configured to control the guidance apparatus. When a user boards as the at least one passenger, the control apparatus determines which of the first room and the second room the user is to board, based on information regarding the user. The guidance apparatus is configured to guide and board the user to whichever of the first room and the second room determined by the control apparatus.

15 Claims, 6 Drawing Sheets

VEHICLE, VEHICLE CONTROL METHOD AND OPERATION MANAGEMENT SYSTEM

CROSS-REFERENCE TO RELATED APPLICATION

This application claims priority to and the benefit of Japanese Patent Application No. 2019-141646 (filed on Jul. 31, 2019), the entire contents of which are incorporated herein by reference.

TECHNICAL FIELD

The present disclosure relates to a vehicle, a vehicle control method and an operation management system.

BACKGROUND

Vehicles which operate on demand from users are known. For example, Patent Literature (PTL) 1 discloses an operation management method for improving operation efficiency.

CITATION LIST

Patent Literature

PTL 1: JP 2019-016290 A

SUMMARY

In a case in which a plurality of users rides together on a vehicle, a combination of users who are restricted from riding together on the vehicle, according to attributes of the users, may arise. Restrictions for the users riding together on the vehicle may reduce the operation efficiency of the vehicle. It is desired to improve the operation efficiency of the vehicle, regardless of the attributes of the users.

It would therefore be helpful to improve the operation efficiency of a vehicle.

A vehicle according to an embodiment of the present disclosure includes:

a cabin having a first room and a second room that are capable of accommodating at least one passenger, and configured to isolate one or more passengers accommodated in the first room from one or more passengers accommodated in the second room;

a guidance apparatus configured to guide the at least one passenger to be accommodated in either the first room or the second room; and a control apparatus configured to control the guidance apparatus, wherein when a user boards as the at least one passenger, the control apparatus determines which of the first room and the second room the user is to board, based on information regarding the user, and the guidance apparatus is configured to guide the user to whichever of the first room and the second room it is determined by the control apparatus that the user is to board.

A vehicle control method according to an embodiment of the present disclosure is a control method for a vehicle, the vehicle including a cabin having a first room and a second room that are capable of accommodating at least one passenger, and configured to isolate one or more passengers accommodated in the first room from one or more passengers accommodated in the second room. The vehicle control method includes:

determining, when a user boards as the at least one passenger, which of the first room and the second room the user is to board, based on information regarding the user; and guiding the user to whichever of the first room and the second room it is determined that the user is to board.

An operation management system according to an embodiment of the present disclosure includes:

the vehicle; and a server configured to manage reservations for boarding the vehicle.

A vehicle, a vehicle control method, and an operation management system according to an embodiment of the present disclosure may improve the operation efficiency of the vehicle.

DETAILED DESCRIPTION

Figure 1:
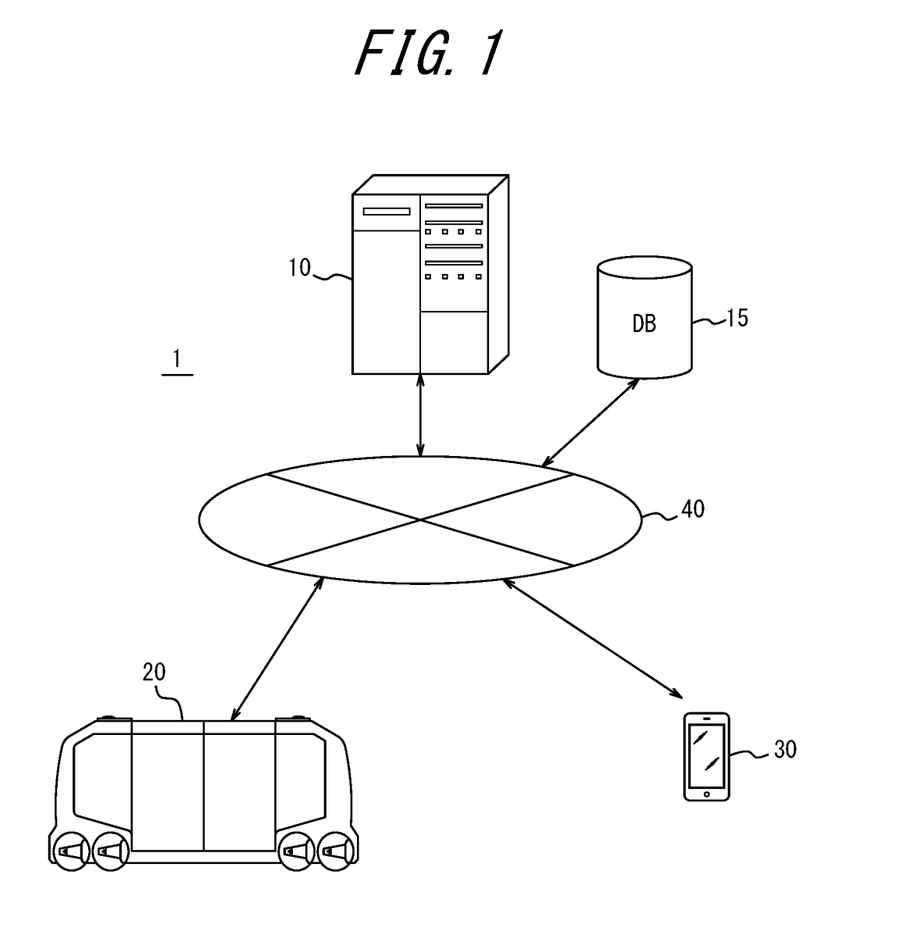
FIG. 1 is a schematic diagram illustrating an exemplary configuration of an operation management system according to an embodiment.
Figure 2:
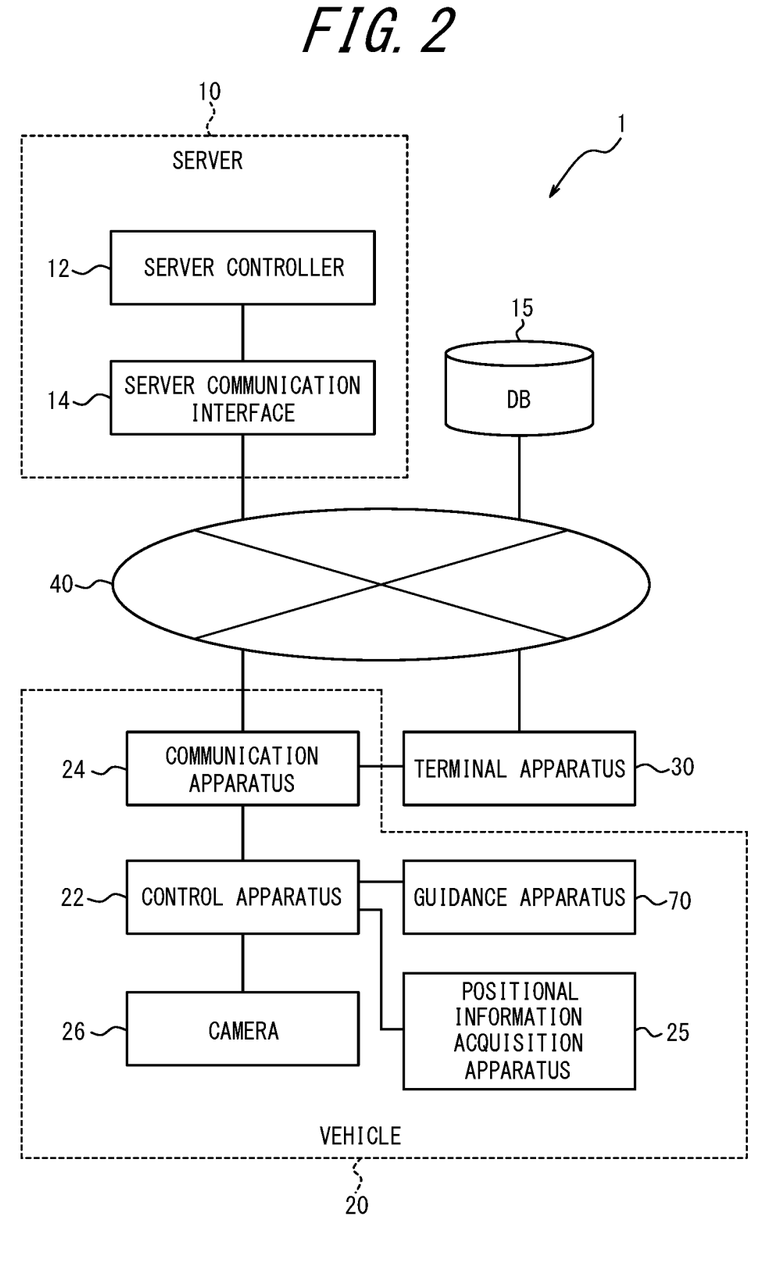
FIG. 2 is a block diagram illustrating an exemplary configuration of an operation management system according to an embodiment.

As illustrated in FIGS. 1 and 2, an operation management system 1 according to an embodiment includes a server 10, a vehicle 20, and a terminal apparatus 30. The operation management system 1 further includes a database (DB) 15, although this is not essential. The server 10, the vehicle 20, the terminal apparatus 30, and the DB 15 are connected to a network 40 and can communicate with each other. Each of the server 10, the vehicle 20, the terminal apparatus 30, and the DB 15 is not limited to one and may be two or more in number.

The vehicle 20 boards a user and operates. The user boarding the vehicle 20 is also referred to as a passenger. The operation management system 1 manages operation of the vehicle 20, which the user can board. The operation management system 1 may manage the operation of the vehicle 20 which the user boards, based on a reservation from the user. The user may be in possession of the terminal apparatus 30 and reserve boarding of the vehicle 20 by accessing the server 10 from the terminal apparatus 30. The server 10 may accept the reservation from the user and control an operation route or an operation schedule for the vehicle 20, based on the reservation. The server 10 may determine whether the reservation from the user is acceptable, based on an operation status of the vehicle 20. The server 10 may determine the operation route or the operation schedule for the vehicle 20 based on a reservation status from the user. A service in which the vehicle 20 operates and the user boards based on the reservation from the user is also referred to as an on-demand bus service. The operation management system 1 can provide the on-demand bus service.

The server 10 may include a single server apparatus, or multiple server apparatuses capable of communicating with each other. The server 10 may be operated, for example, by an entity providing the on-demand bus service. The server 10 manages the reservation for boarding the vehicle 20 accepted from the user. The server 10 may transmit and receive various information regarding the on-demand bus service to and from the vehicle 20. The server 10 may be capable of executing, in addition to these processes, various processes related to the on-demand bus service. The server 10 manages the operation of the vehicle 20. The server 10 may communicate with the vehicle 20 to thereby acquire various information regarding the vehicle 20, such as the position or the speed of the vehicle 20. The server 10 may be capable of executing, in addition to these processes, various processes to manage the operation of the vehicle 20.

The server 10 includes a server controller 12 and a server communication interface 14. The server controller 12 may include at least one processor. The "processor" is a general-purpose processor, a dedicated processor specialized for specific processing, or the like in the present embodiment but not limited to these. The server controller 12 may include at least one dedicated circuit. The dedicated circuit may include, for example, a field-programmable gate array (FPGA) or an application specific integrated circuit (ASIC). The server controller 12 may include the dedicated circuit instead of the processor, or may include the dedicated circuit along with the processor. The server controller 14 may include a communication module and communicate with the vehicle 20. The server 10 may further include a memory. The memory is a semiconductor memory, a magnetic memory, an optical memory, or the like, for example, but not limited to these. The memory may function, for example, as a main memory, an auxiliary memory, or a cache memory. The memory may include an electromagnetic storage medium such as a magnetic disc. The memory may include a non-transitory computer readable medium. The memory may store any information used for operation of the server 10. For example, the memory may store a system program, an application program, or the like. The server 10 may store a program, information, or the like, using the DB 15 as a memory.

The vehicle 20 is a passenger transportation vehicle such as a bus used for the on-demand bus service but not limited to this. The vehicle 20 may be any vehicle that the user can use as a passenger. The vehicle 20 is not limited to one and may be two or more in number. The vehicle 20 may be a vehicle that can operate using automated driving. The automated driving may be, for example, performed according to any level from Level 1 to Level 5 as defined by the Society of Automotive Engineers (SAE). Without being limited to the exemplified definition, the automated driving may be performed based on other definitions.

The vehicle 20 is equipped with a control apparatus 22, a communication apparatus 24, and a camera 26. The control apparatus 22, the communication apparatus 24, and the camera 26 are connected so as to communicate with each other, via a vehicle-mounted network such as a Controller Area Network (CAN), or dedicated lines.

The control apparatus 22 controls each component included in the vehicle 20. The control apparatus 22 may include at least one processor. The control apparatus 22 may include at least one dedicated circuit instead of the processor, or may include at least one dedicated circuit along with the processor. The control apparatus 22 may further include a memory. The communication apparatus 24 communicates with the server 10 via the network 40. The communication apparatus 24 may communicate with the terminal apparatus 30 via the network 40, or may communicate with the terminal apparatus 30 without using the network 40. The communication apparatus 24 may be, for example, a vehicle-mounted communication device. The communication apparatus 24 may include a communication module to connect with the network 40. The communication module may include, but not limited to, a communication module compliant with a mobile communication standard such as the 4th generation (4G) or the 5th generation (5G) standards.

The camera 26 captures an image of a person or an object existing around the vehicle 20. The camera 26 may include an imaging device to image visible light, or an imaging device to image electromagnetic waves other than visible light, such as infrared light. The image captured by the camera 26 is also referred to as a vehicle-mounted camera image. The vehicle 20 may transmit the vehicle-mounted camera image to the server 10 using the communication apparatus 24.

The vehicle 20 further includes a guidance apparatus 70. The guidance apparatus 70 guides the user when the user boards the vehicle 20, as will be described later.

The vehicle 20 may further include a positional information acquisition apparatus 25. The positional information acquisition apparatus 25 and other components mounted in the vehicle 20 are connected so as to communicate with each other, via a vehicle-mounted network such as a CAN, or dedicated lines. The positional information acquisition apparatus 25 acquires positional information for the vehicle 20. The positional information acquisition apparatus 25 may include a receiver compliant with a satellite positioning system. The receiver compliant with the satellite positioning system may include, for example, a Global Positioning System (GPS) receiver. In the present embodiment, the vehicle 20 is assumed to be capable of acquiring the positional information for the vehicle 20 itself by using the positional information acquisition apparatus 25. The vehicle 20 may output the positional information for the vehicle 20 itself to the server 10 or to the terminal apparatus 30.

The terminal apparatus 30 communicates with the vehicle 20 via the network 40 or without using the network 40. The terminal apparatus 30 communicates with the server 10 via the network 40. The terminal apparatus 30 may include, for example, a mobile terminal such as a smart phone.

The terminal apparatus 30 may run an application used by the user for reserving boarding of the vehicle 20. The terminal apparatus 30 may communicate with the server 10 to transmit and receive information regarding the user's boarding reservation. When the user boards the vehicle 20, the terminal apparatus 30 may communicate with the vehicle 20 to transmit and receive information for authenticating whether the vehicle 20 is the vehicle 20 allocated to the user's boarding reservation.

The terminal apparatus 30 may acquire positional information for the terminal apparatus 30 itself by, for example, including a configuration that is the same as or similar to that of the positional information acquisition apparatus 25 included in the vehicle 20. The terminal apparatus 30 may output the positional information for the terminal apparatus 30 itself to the server 10 or the vehicle 20.

Cabin Configuration

Figure 3:
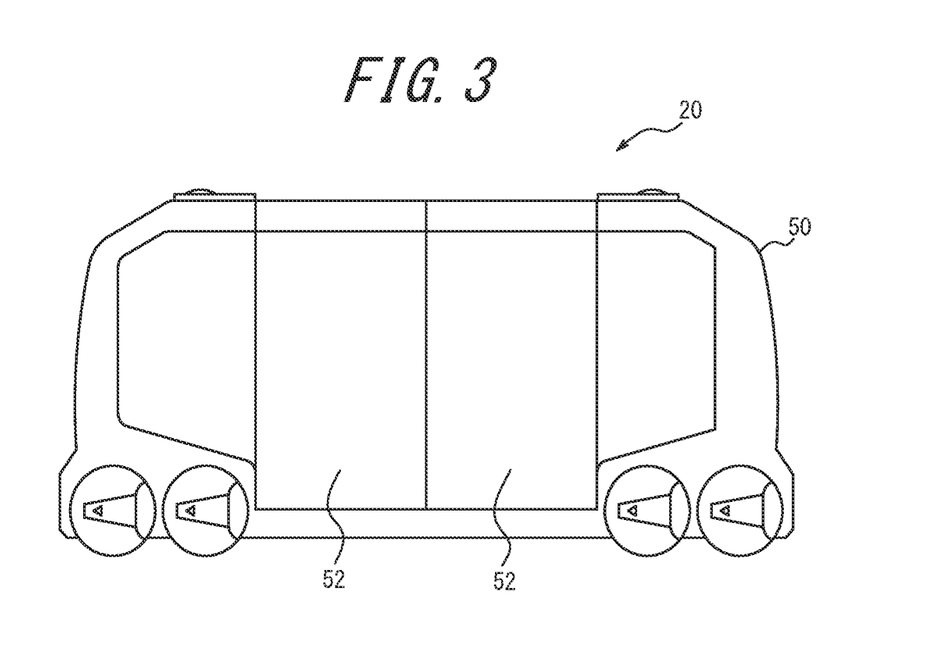
FIG. 3 is a side view illustrating an exemplary configuration of a vehicle according to an embodiment.

As illustrated in FIG. 3, the vehicle 20 includes a body 50. The vehicle 20 may further include at least one door 52. The door 52 is openable and closable. The door 52 may be opened and closed in a variety of manners such as a sliding manner or a folding manner. The user may board and alight the vehicle 20 with the door 52 open. The vehicle 20 may run with the door 52 closed.

Figure 4:
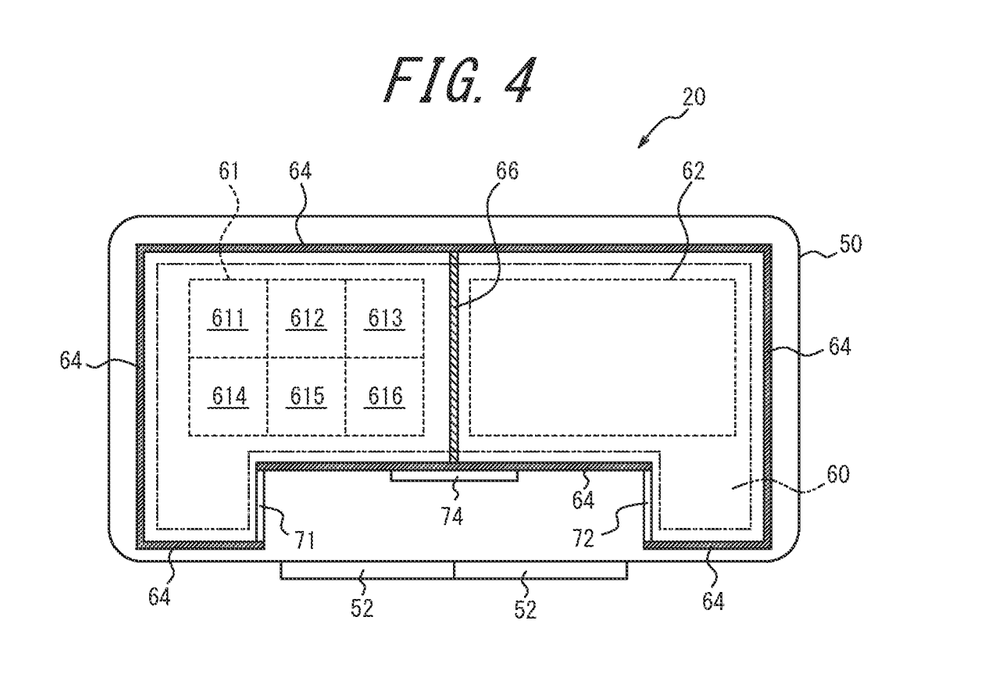
FIG. 4 is a perspective view of an exemplary internal configuration of the vehicle in FIG. 3 seen from above.

As illustrated in FIG. 4, the vehicle 20 includes, within the body 50, a cabin 60 compartmentalized by peripheral walls 64. For convenience, an area of the cabin 60 is represented as an area surrounded by a two-dot chain line. The cabin 60 is capable of boarding users to the vehicle 20 and accommodating them as passengers. The cabin 60 may include seating for the passengers.

The cabin 60 is divided into two areas by a partition wall 66 positioned within the peripheral walls 64. The respective two areas are referred to as a first room 61 and a second room 62. For convenience, the areas of the first room 61 and the second room 62 are each represented as an area surrounded by a broken line. The cabin 60 may be divided into three or more areas, without being limited to two areas. Respective users can board the first room 61 and the second room 62, separately. The vehicle 20 can isolate the respective passengers accommodated in the first room 61 and the second room 62 from each other, using the partition wall 66. The vehicle 20 can be said to be capable of isolating one or more passengers accommodated in the first room 61 from one or more passengers accommodated in the second room 62. The vehicle 20 can also be said to be capable of isolating the one or more passengers accommodated in the second room 62 from the one or more passengers accommodated in the first room 61.

The vehicle 20 further includes the guidance apparatus 70. When the user boards the vehicle 20, the guidance apparatus 70 guides the user to be accommodated in either the first room 61 or the second room 62.

The first room 61 and the second room 62 may include a first door 71 and a second door 72, respectively. The first door 71 and the second door 72 may function as the guidance apparatus 70. In a case in which the first door 71 and the second door 72 function as the guidance apparatus 70, the control apparatus 22 controls opening and closing of the first door 71 and the second door 72. The control apparatus 22 can guide the user to one of the first room 61 and the second room 62 by opening one of the first door 71 and the second door 72. In this way, the control apparatus 22 can control which of the first room 61 and the second room 62 the user is to board.

The guidance apparatus 70 may be configured as a locking apparatus to lock and unlock the first door 71 and the second door 72. The control apparatus 22 may control the locking apparatus, to thereby guide the user to one of the first room 61 and the second room 62.

The guidance apparatus 70 may be configured as a gate apparatus to allow the user to enter, or prevent the user from entering one of the first room 61 and the second room 62. The gate apparatus may be, for example, installed in front of the first door 71 and the second door 72, or installed instead of the first door 71 and the second door 72. The control apparatus 22 may control the gate apparatus, to thereby guide the user to one of the first room 61 and the second room 62.

The guidance apparatus 70 may include a notification unit 74. The notification unit 74 may display information notifying the user as to which of the first room 61 and the second room 62 the user should board. The notification unit 74 may include a display device. The display device may display, for example, characters, figures, images, or the like, that represent information to be announced to the user. The display device may include a light emitting device such as a light emission diode (LED). The display device may be, for example, a liquid crystal display (LCD). The display device may be an organic electro-luminescence (EL) display or an inorganic EL display. The display device may be a plasma display panel (PDP). The display device is not limited to these displays and may be any of various other types of displays. The notification unit 74 may include a light emitting device. The light emitting device may be installed at each of the first door 71 and the second door 72. The control apparatus 22 may notify the user as to which of the first room 61 and the second room 62 the user is to board by lighting the light emitting device at one of the first door 71 and the second door 72. The notification unit 74 may include various other devices, without being limited to these examples.

Sorting of Passengers

The control apparatus 22 may control the guidance apparatus 70 and determine to which of the first room 61 and the second room 62 a user who is boarding the vehicle 20 is to be guided, based on information regarding the user. The information regarding the user includes information regarding an attribute of the user who boards the vehicle 20. The control apparatus 22 can sort and board users who are boarding the vehicle 20 into the first room 61 and the second room 62, based on information regarding the attributes of the users. The information regarding the attribute of the user who boards the vehicle 20 is also referred to as attribute information. The control apparatus 22 may acquire the attribute information from the server 10 or the terminal apparatus 30.

The attribute information may include information specifying which of the first room 61 and the second room 62 the user is to board. In this case, the control apparatus 22 controls the guidance apparatus 70 based on the attribute information, and boards the user to either the first room 61 or the second room 62.

The attribute information may include information specifying whether the user is a subject to be isolated when boarding the vehicle 20. A subject to be isolated when boarding the vehicle 20 is also referred to as an isolation subject. The control apparatus 22 may guide a user who is an isolation subject to the first room 61, and guide a user who is not an isolation subject to the second room 62. The vehicle 20 can isolate one or more passengers guided to and accommodated in the first room 61 from one or more passengers guided to and accommodated in the second room 62. In this manner, the vehicle 20 may isolate a user who is an isolation subject from a user who is not an isolation subject. A user may be regarded as an isolation subject by satisfying a predetermined condition. The predetermined condition may include, for example, having a predetermined symptom, being afflicted by a predetermined disease, or the like. The predetermined symptom may include, for example, a fever, vomiting, a cough, or the like. The predetermined disease may include, for example, an infectious disease such as influenza or a cold.

The attribute information may include information input by the user when the user reserves boarding of the vehicle 20. The information input by the user when the user reserves boarding may include information regarding the user's purpose for boarding the vehicle 20. That is, the server 10 may accept an input of the user's purpose for boarding when the user reserves boarding of the vehicle 20. The user sometimes wishes to board the vehicle 20, for example, in order to see a doctor at a medical institution such as a hospital. The control apparatus 22 may guide the user whose purpose for boarding is to see a doctor at a medical institution such as a hospital, to the first room 61, and may guide the other users to the second room 62. For example, the user sometimes wishes to board the vehicle 20 and move while taking a rest, for example, when the user is in poor physical condition or is aware of a symptom such as a fever or a cough. The control apparatus 22 may guide the user who boards the vehicle 20 due to poor physical condition or a subjective symptom, to the first room 61, and may guide the other users to the second room 62.

The information input by the user when the user reserves boarding may include information regarding a location at which the user is to alight the vehicle 20. In this case, the control apparatus 22 may guide a user who is to alight at a medical institution such as a hospital to the first room 61, and may guide other users to the second room 62.

The vehicle 20 may include a diagnostic kit and/or medicine in the first room 61. In a case in which a user who is to see a doctor at a medical institution such as a hospital is guided to the first room 61, the vehicle 20 may provide the user with the diagnostic kit and/or the medicine. The diagnostic kit may be used to diagnose whether the user is afflicted by an infectious disease such as influenza. The medicine may include an antipyretic agent or the like. A doctor or a nurse, a pharmacist, or the like may also board the vehicle 20 and may provide the user with the diagnostic kit and/or the medicine. The vehicle 20 may include equipment that enables an audio call or a video call between the doctor or the nurse, the pharmacist, or the like, and the user. The vehicle 20 may include equipment that can provide the user with the diagnostic kit and/or the medicine through remote manipulation by the doctor or the nurse, the pharmacist, or the like, to whom the user calls.

The information input by the user when the user reserves boarding may include information regarding a location at which the user is to board the vehicle 20. In this case, the control apparatus 22 may guide a user who boards from a medical institution such as a hospital, to the first room 61, and may guide other users to the second room 62.

The control apparatus 22 may capture an image of the user who boards with the camera 26 prior to boarding, and acquire the captured vehicle-mounted camera image as the attribute information. The camera 26 may include a thermal imaging camera. The control apparatus 22 may detect the body temperature of a user who boards based on an image captured by the thermal imaging camera, and acquire the detected body temperature as the attribute information for the user. In a case in which the body temperature of the user is equal to or higher than a predetermined value, the control apparatus 22 may guide the user to the first room 61 as an isolation subject. The control apparatus 22 may judge, for example, whether the user is wearing a mask based on the vehicle-mounted camera image and, in a case in which the user is wearing a mask, the control apparatus 22 may guide the user to the first room 61 as an isolation subject.

The partition wall 66 may be movable. The control apparatus 22 may change the respective dimensions of the first room 61 and the second room 62 by moving the partition wall 66. For example, the control apparatus 22 may increase the dimensions of the first room 61 and reduce the dimensions of the second room 62 by moving the partition wall 66 toward the second room 62 side. The control apparatus 22 may move the partition wall 66 based on the numbers of passengers accommodated in the first room 61 and the second room 62. The control apparatus 22 may calculate the respective numbers of passengers accommodated in the first room 61 and the second room 62 based on reservations from users, and move the partition wall 66 based on the calculated numbers of passengers. When a user boards, the control apparatus 22 may determine to which of the first room 61 and the second room 62 the user is to be guided, and move the partition wall 66 based on the result of the determination. In a case in which the vehicle 20 includes a seat, the seat may be movable so as not to hinder movement of the partition wall 66, or may be storable in the floor or the like of the cabin 60.

The first room 61 and the second room 62 may be further subdivided. For example, the first room 61 may be further subdivided into a first compartment 611, a second compartment 612, a third compartment 613, a fourth compartment 614, a fifth compartment 615, and a sixth compartment 616. The number of compartments into which the first room 61 is subdivided is not limited to six, and may be five or less, or may be seven or more. Each compartment may be capable of accommodating only one passenger, or may be capable of accommodating passengers in a group of two or more. The guidance apparatus 70 may include a device to guide the user to each compartment. The control apparatus 22 may control the guidance apparatus 70, to thereby guide users so as to sort and board the users into each compartment.

The control apparatus 22 may judge, based on the vehicle-mounted camera image, whether a user who comes aboard is a socially vulnerable person such as an elderly person, a pregnant woman, or a person with a baby or an infant. In a case in which the user who comes aboard is a socially vulnerable person, the control apparatus 22 may determine a compartment to which the user is to be guided, so as to preventively isolate the user.

Vehicle Control Method Example

Figure 5:
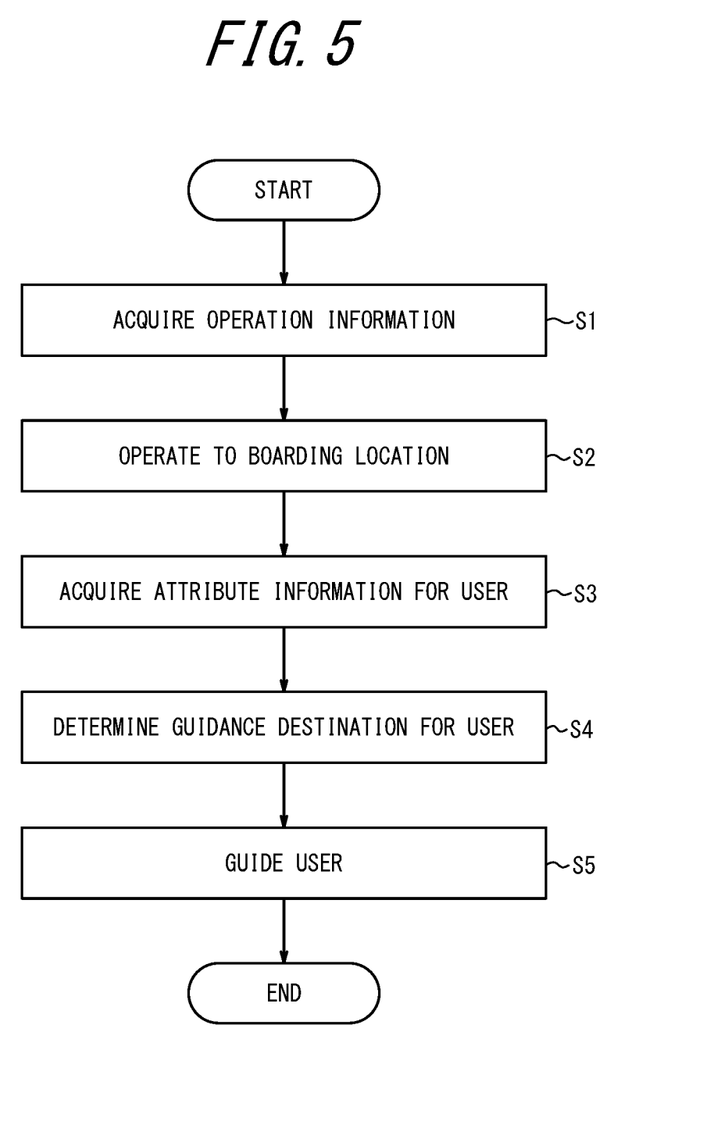
FIG. 5 is a flowchart illustrating an example of procedures which a control apparatus of a vehicle executes.

The control apparatus 22 of the vehicle 20 may execute a vehicle control method including the procedures of the flowchart illustrated in FIG. 5. The vehicle control method may be implemented as a vehicle control program executed by the processor of the control apparatus 22 or the like. The vehicle control program may be stored on a non-transitory computer readable medium.

The control apparatus 22 acquires information regarding operation of the vehicle 20 from the server 10 (Step S1). The information regarding operation of the vehicle 20 is also referred to as operation information. The operation information may include an operation route or an operation schedule for the vehicle 20. The operation information may include information regarding a location at which a user is to board the vehicle 20. The operation information may include attribute information for the user who boards the vehicle 20.

The control apparatus 22 operates the vehicle 20 to the location at which the user is to board the vehicle 20 (Step S2). The location at which the user is to board the vehicle 20 is also referred to as a boarding location.

The control apparatus 22 acquires the attribute information for the user who has a reservation for boarding the vehicle 20 at the boarding location (Step S3). The user who has the reservation for boarding the vehicle 20 is also referred to as a reserving user. The control apparatus 22 may acquire the attribute information for the reserving user from the server 10. The control apparatus 22 may acquire the attribute information for the reserving user from the terminal apparatus 30 in the possession of the reserving user.

The control apparatus 22 determines which of the first room 61 and the second room 62 the user is guided to, based on the attribute information for the user who comes aboard (Step S4). That is, the control apparatus 22 determines a guidance destination for the user within the cabin 60.

The control apparatus 22 guides the user to the guidance destination determined in Step S4, and boards the user to the vehicle 20 (Step S5). After executing the procedure of Step S5, the control apparatus 22 ends execution of the flowchart of FIG. 5.

As described above, the vehicle 20 according to the present embodiment can sort and board the users, based on the attribute information for the users. In this way, a user restricted from riding together with other users can be isolated and can board simultaneously with the other users. As a result, the operation efficiency of the vehicle 20 is improved.

Operation Management Method Example

Figure 6:
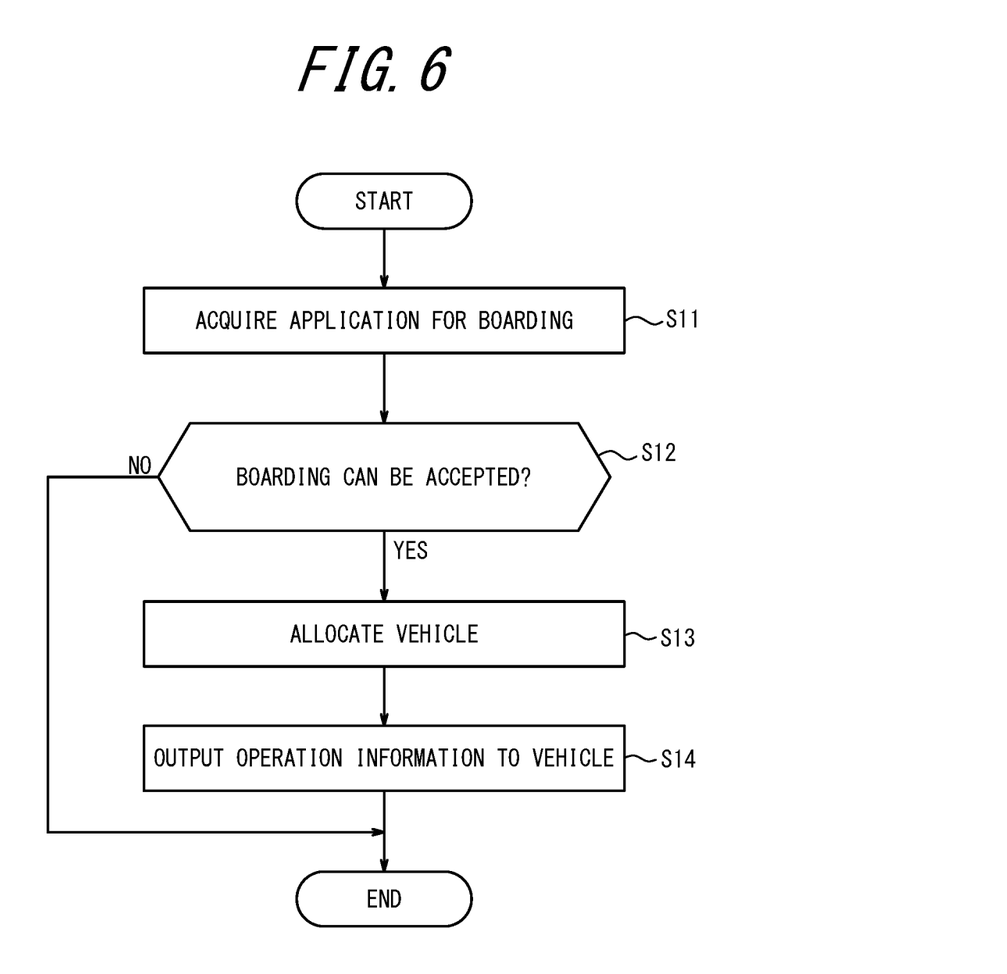
FIG. 6 is a flowchart illustrating an example of procedures which a server executes.

The server 10 included in the operation management system 1 may execute an operation management method including the procedures of the flowchart illustrated in FIG. 6. The operation management method may be implemented as an operation management program executed by the processor of the server 10 or the like. The operation management program may be stored on a non-transitory computer readable medium.

The server 10 acquires an application for boarding from a user (Step S11). The user can apply for boarding of the vehicle 20 by operating a terminal apparatus 30 in the possession of the user. The terminal apparatus 30 may allow the user to designate a boarding location or a boarding time. The terminal apparatus 30 may allow the user to input the user's own attribute information. The terminal apparatus 30 may allow the user to input a purpose for boarding the vehicle 20. The terminal apparatus 30 generates information regarding the application for boarding based on the information input by the user, and outputs the generated information to the server 10. The server 10 may have previously registered the user as a member and store the attribute information for the registered user. The server 10 may accept a reservation for boarding the vehicle 20 only from a user who is registered as the member. The server 10 may preferentially accept reservations from users who are registered as members.

The server 10 judges whether the application for boarding from the user can be accepted (Step S12). The server 10 may judge, for example, whether the user can board the vehicle 20, based on the boarding location or the boarding time designated by the user. The server 10 may judge whether the user can board the vehicle 20, based on the attribute information for the user.

In a case in which the server 10 judges that the server 10 cannot accept the application for boarding from the user (Step S12: NO), the server 10 ends the procedures of the flowchart in FIG. 6. In a case in which the server 10 cannot accept the application for boarding from the user, the server 10 may output information indicating that the application cannot be accepted, to the terminal apparatus 30. The terminal apparatus 30 may notify the user that the application cannot be accepted.

In a case in which the server 10 judges that the server 10 can accept the application for boarding from the user (Step S12: YES), the server 10 allocates the vehicle 20 which the user will board (Step S13). For example, the server 10 may allocate a vehicle 20 which operates on a route passing through the boarding location designated by the user. For example, the server 10 may allocate a vehicle 20 which is operating at the boarding time designated by the user. The server 10 may allocate a vehicle 20 located within a predetermined range from the boarding location designated by the user, at the boarding time designated by the user. In a case in which the server 10 accepts the application for boarding from the user, the server 10 may output information indicating that the application is accepted, to the terminal apparatus 30. The terminal apparatus 30 may notify the user that the application is accepted. The terminal apparatus 30 may notify the user of the accepted contents. The server 10 may output information specifying the boarding location or the boarding time of the user to the terminal apparatus 30. The terminal apparatus 30 may notify the user of the information specifying the boarding location or the boarding time of the user.

The server 10 outputs the operation information to the vehicle 20 allocated based on the application for boarding from the user (Step S14). The server 10 modifies the operation information for the allocated vehicle 20 based on the boarding location and the boarding time of the user, and outputs the modified operation information to the vehicle 20. The operation information includes the operation route and the operation schedule. After executing the procedure of Step S14, the server 10 ends the procedures of the flowchart in FIG. 6.

Figure 7:
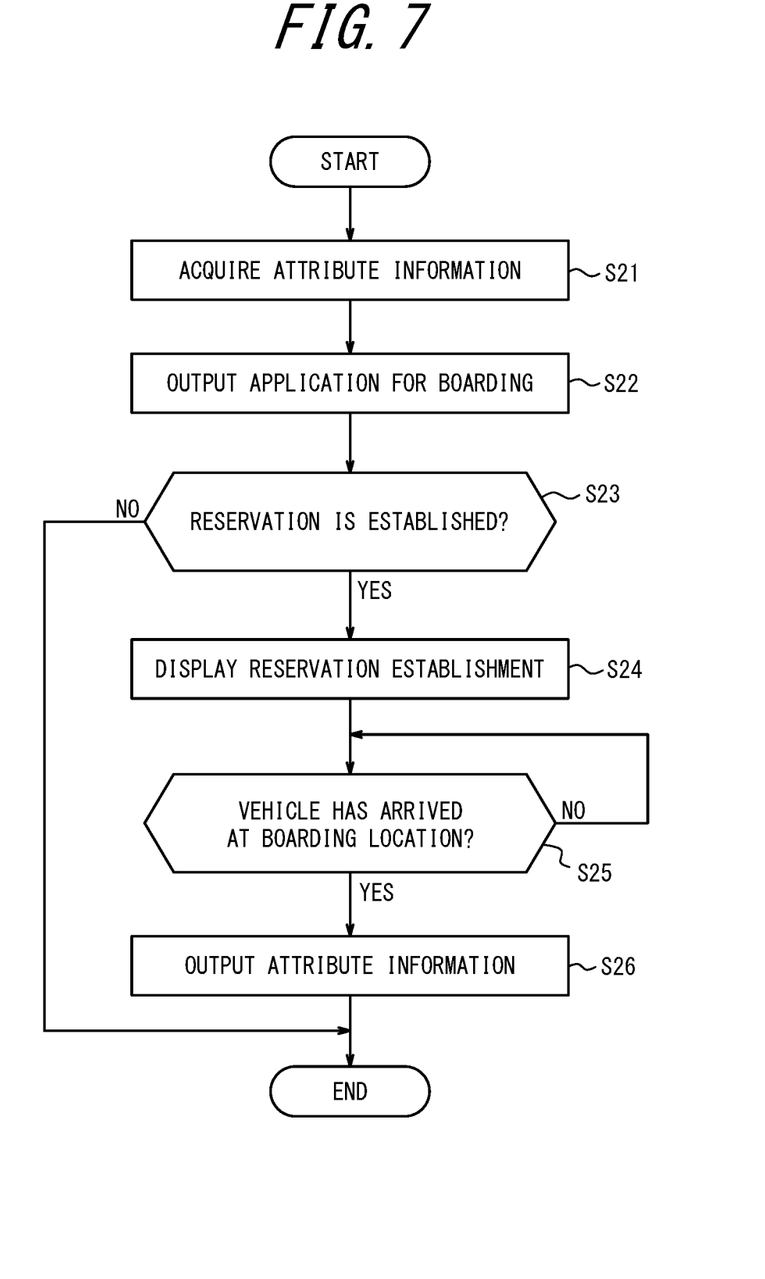
FIG. 7 is a flowchart illustrating an example of procedures which a terminal apparatus executes.

The terminal apparatus 30 included in the operation management system 1 may execute a control method including the procedures of the flowchart illustrated in FIG. 7. The control method may be implemented as a control program executed by the processor of the terminal apparatus 30 or the like. The control program may be stored on a non-transitory computer readable medium.

The terminal apparatus 30 acquires the attribute information for the user (Step S21). The terminal apparatus 30 may accept an input from the user, and acquire the input by the user as the attribute information for the user.

The terminal apparatus 30 outputs the application for boarding from the user (Step S22). The terminal apparatus 30 may accept an input of information designating the boarding location and the boarding time from the user. The terminal apparatus 30 may generate information regarding the application for boarding based on the information input from the user, and output the generated information to the server 10. The terminal apparatus 30 may output the attribute information for the user together with the information regarding the application for boarding, to the server 10. The information regarding the application for boarding may include the attribute information for the user.

The terminal apparatus 30 judges whether a reservation for boarding based on the application for boarding from the user is established (Step S23). The terminal apparatus 30 may acquire the information indicating whether the application for boarding can be accepted or cannot be accepted, from the server 10, and judge whether the reservation for boarding is established based on the acquired information.

In a case in which the terminal apparatus 30 judges that the reservation for boarding is not established (Step S23: NO), the terminal apparatus 30 ends the procedures of the flowchart in FIG. 7. In a case in which the terminal apparatus 30 judges that the reservation for boarding is not established, the terminal apparatus 30 may display information indicating that boarding cannot be reserved.

In a case in which the terminal apparatus 30 judges that the reservation for boarding is established (Step S23: YES), the terminal apparatus 30 displays information indicating that the reservation for boarding is established (Step S24). The terminal apparatus 30 may display information regarding the boarding location or the boarding time. The terminal apparatus 30 may display a route or a method for the user to move to the boarding location. The terminal apparatus 30 may display a message or an image that encourages the user to move to the boarding location.

The terminal apparatus 30 judges whether the vehicle 20 allocated for the user to board has arrived at the boarding location (Step S25). The terminal apparatus 30 may acquire positional information for the vehicle 20 from the vehicle 20 or the server 10. The terminal apparatus 30 may judge whether the vehicle 20 which the user is to board has arrived at the boarding location, based on the positional information for the vehicle 20.

In a case in which the terminal apparatus 30 judges that the vehicle 20 allocated for the user to board has not arrived at the boarding location (Step S25: NO), the terminal apparatus 30 repeats the procedure of Step S25. The terminal apparatus 30 may estimate a time at which the vehicle 20 will arrive at the boarding location, based on the positional information for the vehicle 20, and display the estimated time. The terminal apparatus 30 may acquire the operation information for the vehicle 20 from the server 10, and display the time at which the vehicle 20 will arrive at the boarding location.

In a case in which the terminal apparatus 30 judges that the vehicle 20 allocated for the user to board has arrived at the boarding location (Step S25: YES), the terminal apparatus 30 outputs the attribute information for the user to the vehicle 20 (Step S26). The vehicle 20 guides the user based on the attribute information for the user. After executing Step S26, the terminal apparatus 30 ends the procedures of the flowchart in FIG. 7.

As described above, the operation management system 1 according to the present embodiment can board users while isolating them within one vehicle 20. In this way, a user restricted from riding together with other users can board simultaneously with the other users. As a result, the operation efficiency of the vehicle 20 is improved.

While an embodiment of the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like, may be rearranged without logical inconsistency, and a plurality of means, steps, or the like can be combined into one, or divided.

The invention claimed is:

1. A vehicle comprising:
a cabin having a first room and a second room that are capable of accommodating at least one passenger, the at least one passenger making a reservation for boarding the vehicle, and configured to isolate one or more passengers accommodated in the first room from one or more passengers accommodated in the second room;
a guidance apparatus programmed to guide the at least one passenger to be accommodated in either the first room or the second room;
a processor programmed to control the guidance apparatus; and
a camera programmed to capture an image of the at least one passenger prior to boarding,
wherein the processor is programmed to:
when a user boards as the at least one passenger, determine which of the first room and the second room the user is to board, based on information regarding the user;
acquire the image of the user captured by the camera as the information regarding the user;
determine whether the user is an isolation subject based on a predetermined symptom, a predetermined disease, or a body temperature of the user, or wearing a mask; and
when it is determined that the user is an isolation subject, determine that the user is to board the first room,
the guidance apparatus comprises:
a first door of the first room and a second door of the second room, opening and closing of which are controlled to thereby guide the user to either the first room or the second room;
a gate to allow the user to enter, or prevent the user from entering one of the first room and the second room; or
a display device to display information notifying the user as to which of the first room and the second room the user should board, and
the guidance apparatus is programmed to guide the user to whichever of the first room and the second room it is determined by the processor that the user is to board.

2. The vehicle according to claim 1, wherein the processor is programmed to communicate with a server that manages reservations for boarding the vehicle, and is programmed to acquire the information regarding the user from the server.

3. The vehicle according to claim 2, wherein the information regarding the user includes information input by the user when the user accesses the server to reserve boarding.

4. The vehicle according to claim 3, wherein the information regarding the user includes the user's purpose for boarding the vehicle and/or a location at which the user is to alight.

5. The vehicle according to claim 1, wherein the camera includes a thermal imaging camera.

6. The vehicle according to claim 1, further comprising in the first room a diagnostic kit and/or medicine.

7. The vehicle according to claim 1, further comprising a partition wall configured to isolate the one or more passengers accommodated in the first room and the one or more passengers accommodated in the second room from each other, the partition wall being movable, wherein
the processor is programmed to move the partition wall based on respective numbers of passengers accommodated in the first room and the second room.

8. A vehicle control method being a control method for a vehicle, the vehicle including a cabin having a first room and a second room that are capable of accommodating at least one passenger, the at least one passenger making a reservation for boarding the vehicle, the vehicle including a camera programmed to capture an image of the at least one passenger prior to boarding, and a guidance apparatus programmed to isolate one or more passengers accommodated in the first room from one or more passengers accommodated in the second room, the vehicle control method comprising:
determining, when a user boards as the at least one passenger, which of the first room and the second room the user is to board, based on information regarding the user;
acquiring the image of the user captured by the camera as the information regarding the user;
determining whether the user is an isolation subject based on a predetermined symptom, a predetermined disease, or a body temperature of the user, or wearing a mask;
when it is determined that the user is an isolation subject, determining that the user is to board the first room; and
guiding, by using the guidance apparatus, the user to whichever of the first room and the second room it is determined that the user is to board, wherein the guidance apparatus comprises:

a first door of the first room and a second door of the second room, opening and closing of which are controlled to thereby guide the user to either the first room or the second room;

a gate to allow the user to enter, or prevent the user from entering one of the first room and the second room; or a display device to display information notifying the user as to which of the first room and the second room the user should board.

9. The vehicle control method according to claim 8, further comprising:

communicating with a server that manages reservations for boarding the vehicle; and acquiring the information regarding the user from the server.

10. The vehicle control method according to claim 9, wherein the information regarding the user includes information input by the user when the user accesses the server to reserve boarding.

11. The vehicle control method according to claim 10, wherein the information regarding the user includes the user's purpose for boarding the vehicle and/or a location at which the user is to alight.

12. The vehicle control method according to claim 8, further comprising providing, when it is judged that the user is an isolation subject, the user with a diagnostic kit and/or medicine.

13. The vehicle control method according to claim 8, wherein the vehicle further includes a partition wall configured to isolate the one or more passengers accommodated in the first room and the one or more passengers accommodated in the second room from each other, the partition wall being movable, the control method further comprising moving the partition wall based on respective numbers of passengers accommodated in the first room and the second room.

14. The vehicle control method according to claim 8, wherein the first room and the second room have respective doors, and the guiding of the user controls opening and closing of the doors to thereby guide the user to either the first room or the second room.

15. An operation management system comprising:

a server programmed to manage reservations for boarding a vehicle; and the vehicle comprising:

a cabin having a first room and a second room that are capable of accommodating at least one passenger, the at least one passenger making a reservation for boarding the vehicle, and configured to isolate one or more passengers accommodated in the first room from one or more passengers accommodated in the second room;

a guidance apparatus programmed to guide the at least one passenger to be accommodated in either the first room or the second room;

a processor programmed to control the guidance apparatus; and a camera programmed to capture an image of the at least one passenger prior to boarding, wherein the processor is programmed to:

when a user boards as the at least one passenger, determine which of the first room and the second room the user is to board, based on information regarding the user;

acquire the image of the user captured by the camera as the information regarding the user;

determine whether the user is an isolation subject based on a predetermined symptom, a predetermined disease, or a body temperature of the user, or wearing a mask; and when it is determined that the user is an isolation subject, determine that the user is to board the first room, the guidance apparatus comprises:

a first door of the first room and a second door of the second room, opening and closing of which are controlled to thereby guide the user to either the first room or the second room;

a gate to allow the user to enter, or prevent the user from entering one of the first room and the second room; or a display device to display information notifying the user as to which of the first room and the second room the user should board, and the guidance apparatus is programmed to guide the user to whichever of the first room and the second room it is determined by the processor that the user is to board.

* * * * *